Figure 1:
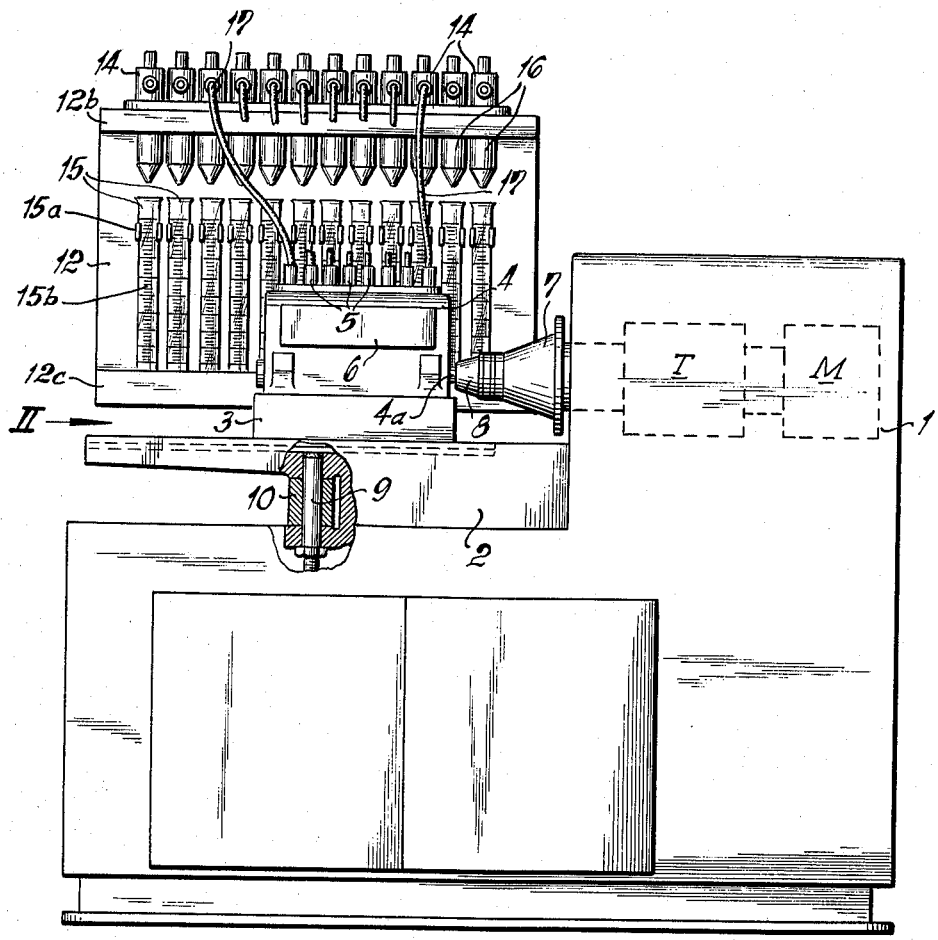

April 19, 1966            F. HAUCK            3,246,509

TESTING APPARATUS FOR FUEL INJECTION PUMPS

Filed April 15, 1963            2 Sheets-Sheet 1

INVENTOR
FRANZ HAUCK

April 19, 1966 F. HAUCK 3,246,509
TESTING APPARATUS FOR FUEL INJECTION PUMPS
Filed April 15, 1963 2 Sheets-Sheet 2

INVENTOR
FRANZ HAUCK
by Michael S. Striker
his attorney

United States Patent Office 3,246,509
Patented Apr. 19, 1966

3,246,509
TESTING APPARATUS FOR FUEL
INJECTION PUMPS
Franz Hauck, Denkendorf Kreis Esslingen, Wurttemberg,
Germany, assignor to Robert Bosch G.m.b.H., Stuttgart, Germany
Filed Apr. 15, 1963, Ser. No. 272,979
2 Claims. (Cl. 73—119)

The present invention relates to testing apparatus for fuel injection pumps, and more particularly to a testing apparatus which is especially suited for testing of multiple-unit fuel injection pump systems for internal combustion engines. Still more particularly, the invention relates to an apparatus which is utilized to test pump systems of the type comprising a series of individual pumps mounted in a common housing and having a row of outlets serving to deliver measured amounts of fuel to combustion chambers of the respective cylinders in an internal combustion engine.

Pump systems of the just outlined type must be tested from time to time to determine whether or not the individual pumps deliver requisite quantities of fuel per unit of time and to enable an operator to rapidly adjust all such individual pumps whose output exceeds or is less than an optimum output. As a rule, the elongated housing of the pump system comprises a plate-like cover which is adjacent to one of its sides and which must be removed to expose the control mechanisms which must be manipulated by an operator to regulate the output of the respective pumps. In many pump systems, the covers are located at the left-hand side of the pump housing; however, there exist pump systems wherein the cover is located at the right-hand side of the pump housing. Conventional testing apparatus of which I have knowledge at this time are not constructed with a view to facilitate rapid and convenient inspection and testing of pump systems wherein the covers are located at the one or at the other side of the pump housing. Moreover, many testing apparatus for such types of pump systems are rather bulky and expensive, particularly if they are constructed with a view to facilitate testing of different types of pump systems.

Accordingly, it is an important object of my invention to provide a very simple, lightweight, compact and easy-to-handle testing apparatus which may be used with advantage for testing of both aforementioned types of multiple-unit pump systems.

Another object of the invention is to provide a testing apparatus which may be rapidly and conveniently converted for testing of pump systems wherein the cover for the control mechanisms of individual pumps is located at the right-hand side or at the left-hand side of the pump housing.

A further object of the invention is to provide a testing apparatus of the just outlined characteristics which may be adjusted by an operator in such a way that the results of tests may be observed at the time the operator manipulates a given control mechanism, and which may be adjusted prior to, subsequent to or in actual use.

An additional object of the instant invention is to provide a testing apparatus of the above outlined characteristics which is constructed and assembled with a view to require shifting of a small number of parts at the time the apparatus is to be converted for use with a different type of multiple-unit fuel injection pump systems, and wherein a single rotary shaft suffices to transmit motion to all types of such pump units.

Still another object of the invention is to provide a testing apparatus which may be rapidly connected to or disconnected from a pump system so that the intervals between tests carried out with consecutive pump systems are reduced to a minimum.

With the above objects in view, one feature of my invention resides in the provision of a testing apparatus which comprises a support for the housing of a multiple-unit fuel injection pump system, means including a driven shaft for operating the pump shaft so that the outlets of individual pumps discharge fuel at a given rate, fixed pivot means having an axis which is normally perpendicular to the axis of the driven shaft, a carriage swingably supported by and movable with respect to the pivot means from the one to the other side of the pump housing so that it may be adjusted in a selected position at that side of the pump housing which is disposed opposite the cover serving to expose or to conceal the control mechanisms for the individual pumps, receptacles (normally assuming the form of graduated test tubes) mounted on the carriage, and fuel conveying means mounted on the carriage in registry with the receptacles and adapted to be connected with the outlets of the pumps to deliver fuel into the respective receptacles when the pump shaft is driven.

Figure 2:
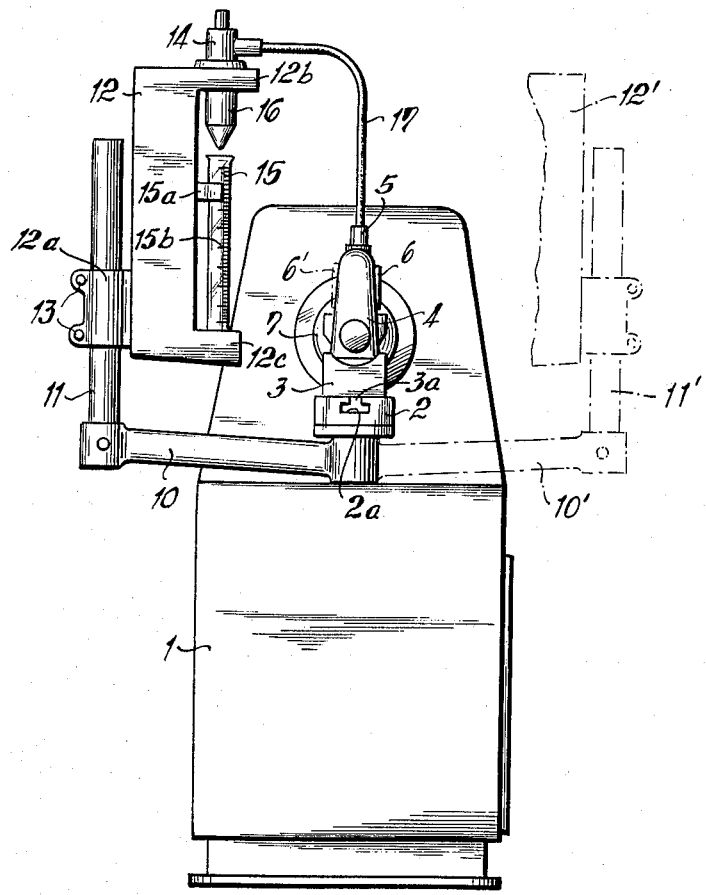

The novel features which are considered as characteristic of the invention are set forth in particular in the appended claims. The improved testing apparatus itself, however, both as to its construction and its mode of operation, together with additional features and advantages thereof, will be best understood from the following detailed description of a specific embodiment with reference to the accompanying drawings, in which:

FIG. 1 is a somewhat schematic front elevational view of a testing apparatus which embodies my invention; and FIG. 2 is an end view of the apparatus as seen in the direction of arrow II in FIG. 1, a different position of the carriage for the receptacles being indicated in phantom lines.

Referring now in greater detail to the drawings, there is shown a testing apparatus which comprises a main supporting means or frame 1 for a horizontal table or bed 2 whose upper side is formed with an elongated groove 2a for a rail 3a extending from the underside of a pump support 3. This support may be adjusted along the groove 2a and is constructed to support the common housing of a multiple-unit fuel injection pump system 4 of the type having an individual injection pump for each cylinder of an internal combustion engine. The individual injection pumps are adjustable in a manner known in the art to deliver measured quantities of fuel to the respective cylinders through suitable spray nozzles (not shown) which discharge into the combustion chambers of the cylinders. The pump system 4 comprises eight individual pumps whose outlets 5 are arranged in a single row which is parallel and coplanar with the axis of the pump shaft 4a. The control mechanisms (not shown) for the individual pumps are accessible upon removal of a plate-like cover or lid 6 which extends along one side and in the longitudinal direction of the pump system 4. The pump shaft 4a is coupled to the driven shaft 7 of the testing apparatus by a suitable clutch 8, and the shaft 7 may be driven at different speeds through a variable-speed transmission T which is accommodated in the frame 1 and which is driven by a suitable motor M. The parts M, T and 7, 8 together constitute a driving arrangement for the pump system 4. The left-hand end of the pump shaft 4a, as viewed in FIG. 1, is normally connected with a suitable speed regulator (not shown).

The frame 1 supports a vertical pivot member 9 here shown as a bolt which extends downwardly from the table 2 and which serves to support one end portion of a horizontal arm 10 so that the latter may pivot about a fixed vertical axis to move between the full-line position and the phantom-line position 10′ of FIG. 2. The other end portion of the arm 10 supports an upwardly extending vertical column or rod 11 for a bracket 12a forming part of or rigidly secured to a carriage 12. The means for adjustably fixing the bracket 12a to the column 11 comprises screw bolts 13 or the like, and the arrangement is normally such that the bracket 12a is held against rotation with respect to the column, for example, by means of a pin-and-slot connection or the like. In other words, provision is made for adjusting the level but without changing the angular position of this carriage with respect to the upright 11 and arm 10.

In the illustrated embodiment, the carriage 12 assumes the shape of a substantially U-shaped body having a vertical web which is rigid with the bracket 12a and two horizontal legs or ledges including an upper ledge 12b and a lower ledge 12c. The ledge 12b serves to support and is traversed by a row of twelve downwardly directed nozzles 14 eight of which are connected with the outlets 5 of the individual pumps in the housing of the pump system 4. The lower ledge 12c supports twelve receptacles here shown as test tubes 15 which are secured to the web of the carriage 12 by suitable clamps 15a. It will be noted that the open upper end of each test tube is located beneath and is in registry with one of the nozzles 14. Each nozzle 14 cooperates with an antisplash device 16 which directs the jet of fuel into the respective test tube 15, and FIG. 1 shows that the test tubes are provided with suitable graduations, as at 15b, to facilitate the measurement. The nozzles 14 receive fuel through connecting conduits 17 which are secured to the respective outlets 5. Each conduit 17 constitutes with the respective parts 14, 16 a fuel conveying means which is in registry with the respective test tube and which is detachable from one of the outlets 5.

The testing apparatus is operated as follows:

The pump unit 4 is fixed to the support 3 in such a way that its cover 6 is located at that side of its housing which faces away from the carriage 12. The support 3 is then moved in the longitudinal direction of the groove 2a so that the pump shaft 4a may be connected with the driven shaft 7 via clutch 8. Eight conduits 17 are then secured to the outlets 5 and the motor M is started to operate the pump system whereby the individual pumps begin to deliver fuel through the respective nozzles 14.

The cover 6 is removed to expose and to afford access to the control mechanisms of the individual pumps so that an operator, after comparing the amounts of fuel accumulating in the individual test tubes 15, may adjust the output of certain pumps in order to insure that all of the pumps will deliver equal amounts of fuel per unit of time. An operator standing in front of the testing apparatus (i.e., to the right of FIG. 2) is in a position to reach the control mechanisms through the opening which is exposed upon removal of the cover 6, and the operator is also in a position to observe the graduations 15b on the test tubes 15.

The transmission T enables the operator to test the individual pumps at different rotational speeds of the pump shaft 4a. The operator knows how much fuel should accumulate in each test tube 15 per unit of time and at a given r.p.m. of the motor M so that he can adjust each individual pump whose output exceeds or is less than the desired output.

The exact construction of the pump system 4 forms no part of the invention. Such multiple-unit pump systems are often used in connection with diesel engines and each individual pump is adjustable by a control mechanism to insure an equal amount of fuel in each cylinder at the proper time. The pump shaft 4a is normally a cam shaft and the individual pumps are arranged to deliver jets of fuel in a given sequence as is well known in the art. It goes without saying that the pump system 4 is connected to a suitable source of fuel from which the individual pumps draw fluid when the motor M is started.

The axis of the pivot member 9 is preferably disposed in a vertical plane which is parallel to the common plane of the test tubes 15, and the test tubes are normally arranged in two groups which are mirror symmetrical with reference to the plane of the pivot member. As shown in FIG. 1, each such group comprises six test tubes, and the plane passing through the axis of the pivot member 9 is assumed to be perpendicular to the plane of the drawing.

In certain types of multiple-unit pump systems, the cover 6 is located at the other side of the pump housing. This modification is indicated schematically in FIG. 2 which shows in phantom lines a second cover 6′ extending along that side of the pump housing which faces the carriage 12. In such instances, the operator merely swings the arm 10, the upright 11 and the carriage 12 to the other side of the pump system so that these parts respectively assume the phantom-line positions 10′, 11′, 12′. The operator is then free to remove the cover 6′ in order to gain access to the control mechanisms for the individual pumps, and to simultaneously observe the test tubes 15. It will be noted that the carriage 12 may be swung through an angle of at least 180° so as to move between two end positions in each of which it is adjacent to one side of the pump system 4 and in each of which the rows of nozzles 14 and test tubes 15 are parallel with the axes of the shafts 4a, 7. It goes without saying that the carriage 12 may be swung through angles which exceed 180° and that the carriage may be adjusted in any desired intermediate position if such an intermediate position is more convenient to the operator. For example, an operator may desire to have the carriage moved through about 45° from the position of FIG. 1 and toward the position 12′ of FIG. 2 so that the pump housing will not conceal the lower portions of the test tubes 15 at the time the operator adjusts a selected control mechanism upon removal of the cover 6.

The reason that the cover is not always located at the same side of the pump housing is that certain types of pump systems comprise crank shafts which are driven at the right-hand end of the pump housing (as shown in FIG. 1), whereas certain other constructions utilize pump shafts which are driven at the other end of the pump housing (i.e., at the left-hand end, as viewed in FIG. 1). In the latter instance, the pump system must be mounted in such a way that the cover 6 occupies the position 6′.

The axis of the pivot member 9 crosses and preferably intersects the axis of the shaft 4a. Such mounting of the arm 10 insures that the distance between the carriage 12 and the pump system remains unchanged irrespective of whether the carriage is located at the one or at the other side of the pump housing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A testing apparatus for multiple-unit fuel injection pump systems of the type having a common housing for a series of individual pumps which are driven by a common pump shaft and each of which has an outlet through which measured amounts of fuel may be discharged to the combustion chambers of an internal combustion engine, and a cover which is removable from one side of the pump housing to provide access to the control mechanisms for the individual pumps serving to regulate the amount of fuel discharged by the respective pump, said testing apparatus comprising a support provided with a surface on which the pump housing is supported; a driven shaft adapted to be coupled to the pump shaft so as to operate the individual pumps whereby the pumps deliver fuel through the respective outlets; an arm having a portion turnably mounted beneath said surface, said arm being swingable about a substantially vertical pivot axis intersecting an extension of the axis of said driven shaft; a carriage supported by and swingable with said arm about one end of the pump housing in a substantially horizontal arcuate path, said arcuate path being located further from said pivot axis than that end of the pump housing about which the carriage is rocked; receptacles supported by said carriage and adapted to receive fuel discharged from the outlets of the individual pumps in response to rotation of the pump shaft.

2. A testing apparatus as set forth in claim 1, wherein said carriage is adjustable vertically with respect to said arm.

References Cited by the Examiner

UNITED STATES PATENTS 2,632,617   3/1953   Evans _____ 248—124

FOREIGN PATENTS 1,320,464   1/1963   France.
1,126,192   3/1962   Germany.
784,287   10/1957   Great Britain.
558,195   2/1957   Italy.

RICHARD C. QUEISSER, *Primary Examiner.*
DAVID SCHONBERG, *Examiner.*
J. J. SMITH, *Assistant Examiner.*